United States Patent [19]

Statz et al.

[11] 4,422,434
[45] Dec. 27, 1983

[54] SOLAR ENERGY COLLECTION APPARATUS

[75] Inventors: Robert G. Statz; William W. Belson, both of Milwaukee, Wis.

[73] Assignee: Capitol Stampings Corp., Milwaukee, Wis.

[21] Appl. No.: 375,461

[22] Filed: May 6, 1982

[51] Int. Cl.³ .................................................. F24J 3/02
[52] U.S. Cl. ....................................... 126/438; 126/440
[58] Field of Search ................................. 126/438, 440

[56] References Cited

U.S. PATENT DOCUMENTS

| | | | |
|---|---|---|---|
| 3,182,654 | 5/1965 | Culling | 126/424 |
| 4,057,048 | 11/1977 | Maine | 126/440 |
| 4,166,769 | 9/1979 | Dukess | 126/440 |

*Primary Examiner*—Carroll B. Dority, Jr.

*Attorney, Agent, or Firm*—Michael, Best & Friedrich

[57] ABSTRACT

A solar energy collection apparatus comprising a hollow generally spherical means having an energy receiving means located substantially at the center of the spherical means. Circulation means connected to the energy receiving means circulates a heat absorbing fluid through the energy receiving means. A lense means forming a portion of the spherical means is located in the upper portion of the spherical means. The lense means is positioned so as to direct and concentrate solar energy onto the energy receiving means and onto the inner surface of the spherical means. The inner surface of the spherical means upon which the solar energy is directed by the lense means includes a reflective material to thereby reflect the solar energy impinging upon said inner surface back to the energy receiving means.

8 Claims, 4 Drawing Figures

U.S. Patent
Dec. 27, 1983
4,422,434
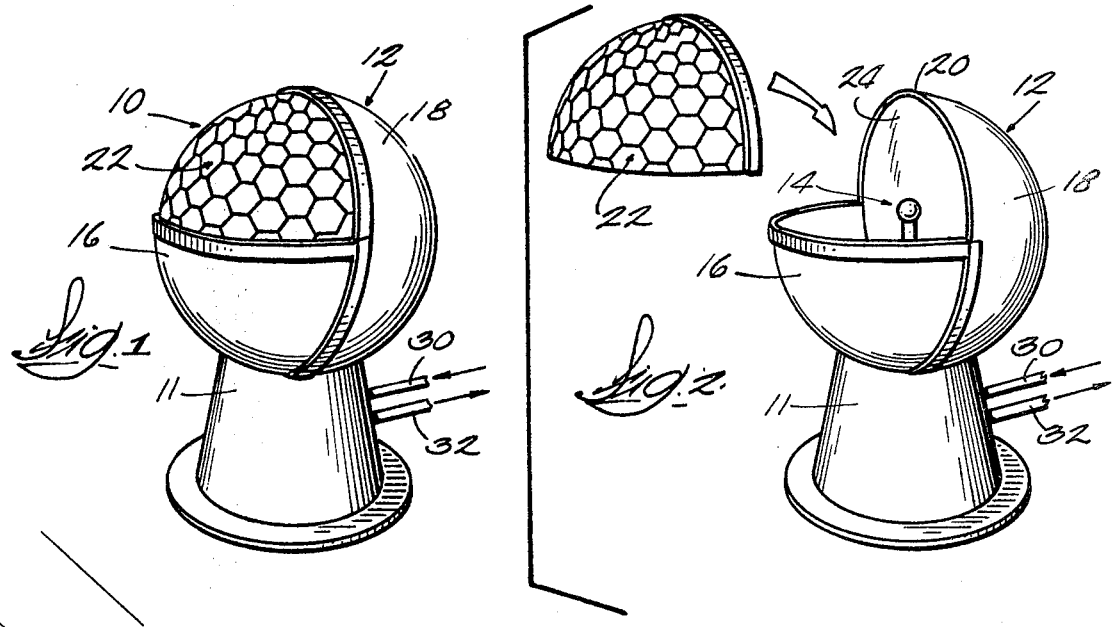
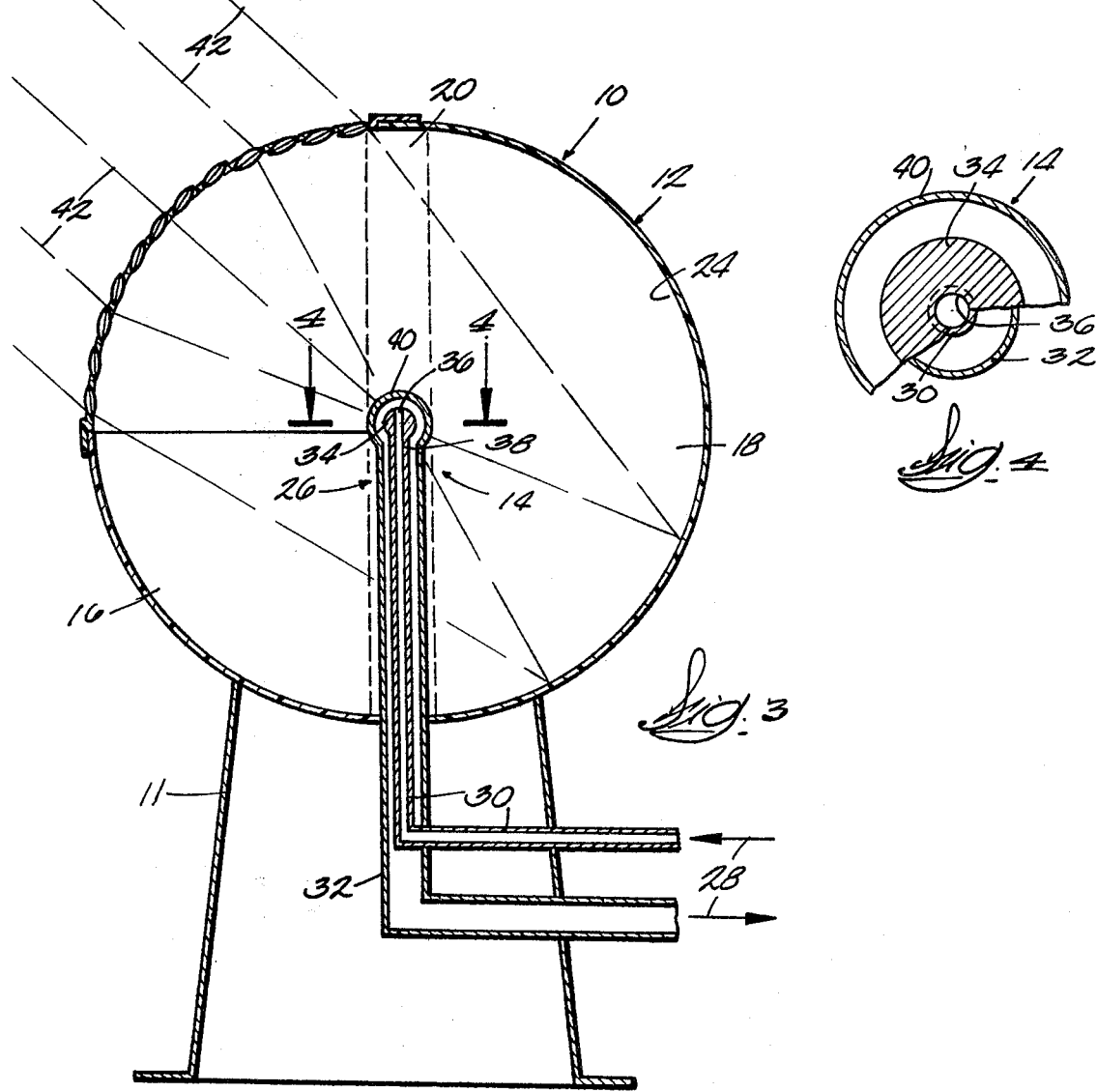

SOLAR ENERGY COLLECTION APPARATUS

BACKGROUND OF THE INVENTION

This invention relates to solar energy collection apparatuses and, more particularly, to apparatuses of a generally spherical nature making use of a plurality of lenses for concentrating the solar energy of the sun onto an energy receiving means.

It has become especially desirable in recent years to develope more efficient means for extracting energy from the sun. A number of approaches have been made to solving the problem of collecting solar energy efficiently, but many of these approaches have been impractical for various reasons.

Some systems use optical lenses for the purpose of concentrating the radiant energy of the sun onto various means for extracting the solar energy. Some such approaches have incorporated the use of a reflective surface in conjunction with lenses to help focus the sun's energy onto the energy receiving mechanism. Examples of such devices can be found in the following U.S. Patents:

| Patentee | U.S. Pat. No. |
|---|---|
| Kelly | 4,168,696 |
| Niederle | 1,989,999 |
| Culling | 3,182,654 |

A number of U.S. patents disclose the use of a plurality of lenses in a generally spherical form for the purpose of concentrating the sun's solar energy onto some heat receiving means. Dukess U.S. Pat. No. 4,166,769 discloses the use of a generally spherical member comprising a plurality of lenses with an expandable energy receiving member at the center of the spherical member. Davis U.S. Pat. No. 4,136,670 discloses the use of a hemispherical plurality of lenses used for concentrating the sun's radiant energy onto a circular collector dish. Maine U.S. Pat. No. 4,057,048 discloses the use of a hemispherical member for concentrating the sun's radiant energy onto a shallow tray of water.

Dandini U.S. Pat. No. 3,934,573 describes the use of a spherical member containing a plurality of lenses for the purpose of concentrating the sun's radiant energy onto a boiler located at the center of the spherical member. Heat absorbing fluid is transmitted through the boiler for purposes of absorbing heat for conversion to useful power.

SUMMARY OF THE INVENTION

One of the principal objects of this invention is to provide a solar energy collection apparatus which is relatively compact but capable of absorbing a significant amount of solar energy.

Another of the principal objects of this invention is to provide a solar energy collection apparatus which is generally more efficient than currently available solar energy collection apparatuses.

Another of the principal objects of this invention is to provide a solar energy collection apparatus which will maintain a reasonable orientation with the sun without having to mechanically adjust its orientation.

For the achievement of the above and other objectives, this invention provides a solar energy collection apparatus comprising a hollow generally spherical means having an energy receiving means located substantially at the center of the spherical means. Circulation means connected to the energy receiving means circulates a heat absorbing fluid through the energy receiving means. A lenses means forming a portion of the spherical means is located in the upper portion of the spherical means. The lenses means is positioned so as to direct and concentrate solar energy onto the energy receiving means and onto the inner surface of the spherical means. The inner surface of the spherical means upon which the solar energy is directed by the lenses means includes a reflective material to thereby reflect the solar energy impinging upon said inner surface back to the energy receiving means.

In one embodiment of this invention, the generally spherical means is comprised of two hemispherical portions connected by a vertical cylindrical portion. The lenses means forms the upper half of one of the hemispherical portions of the generally spherical member, and includes a plurality of lenses concentrically-focused on the energy receiving means.

DESCRIPTION OF THE DRAWINGS

FIG. 1 is a perspective view of a solar energy collection apparatus.

FIG. 2 is a perspective view of the solar energy collection apparatus in FIG. 1 with the lense portion removed showing the location of an energy receiving sphere and reflective inner surfaces of the hollow sphere.

FIG. 3 is a cross-sectional view of the apparatus in FIG. 1.

FIG. 4 is an enlarged sectional view taken along line 4—4 of FIG. 3.

DESCRIPTION OF THE PREFERRED EMBODIMENT

One embodiment of this invention is a solar energy collection apparatus 10 including a hollow generally spherical member 12 with an energy receiving means or sphere 14 mounted at the center of the generally spherical member 12. The spherical member 12 is mounted on a suitable support 11.

The hollow generally spherical member 12 as constructed consists of two hemispherical portions 16 and 18 with a vertically oriented cylindrical portion 20 connecting the two hemispherical portions 16 and 18. The cylindrical portion 20 is approximately equal in width to the diameter of the energy receiving sphere 14. This construction provides for a more optimum focusing and reflecting of the sun's rays onto the energy receiving sphere 14.

Located in an upper portion of the generally sperical member 12 is a lenses means 22 comprising a plurality of lenses concentrically focused on the energy receiving sphere 14. This lenses means 22 forms the upper half of the hemispherical portion 16 of the generally spherical member 12 (as shown in FIG. 1). The lenses are of a one piece construction of plastic molded by conventional means.

Substantially all of the generally spherical member 12 other than the lenses means 22 is made of steel or some other suitable material with either polished reflective inner surfaces 24 or some other reflective surface applied thereto.

Located at the center of the generally spherical member 12 is an energy receiving means or sphere 14. The energy receiving sphere 14 is made of a heat conductive material such as copper and is painted with a radiant energy absorbing paint. The ratio of the area of the inside surface of the generally spherical member and the area of the outside surface of the energy receiving sphere is about 19 to 1.

Connected to the radiant energy receiving sphere 14 are circulating means 26 for circulating a heat absorbent fluid 28, such as water, through the receiving means 14. The energy receiving means 14 and the circulating means 26 consist of an outer cylindrical pipe 32 and an inner cylindrical pipe 30 positioned at the center of the outer pipe 32. One end 38 of the inner cylindrical pipe 30 extends into a bore 36 through the center of an inner sphere 34 attached to the end 38 of the inner pipe 30. A hollow outer sphere 40 is positioned with the inner sphere 34 at the center of the outer sphere 40 and the outer pipe 32 extends into the outer sphere 40 and is attached to the outer sphere 40.

The heat absorbing fluid 28 enters into the inner cylindrical pipe 30, goes up through the inner sphere 34, and then around the inner sphere 34 to inside the outer sphere 40, where the fluid is then heated by the energy impinging upon the outer surface 18 of the outer sphere 40. The fluid then passes down and around the inner cylindrical pipe 30 through the outer cylindrical pipe 32 where it will then exists to be used for domestic water heating or some other purpose.

The solar energy collection apparatus when in use will be positioned so that the lenses means 22 faces in a southerly direction so that during a majority of the day the sun will impinge upon the plurality of lenses. As the sun moves across the southern sky, a majority of the sunlight 43 impinging on the lenses will be focused upon the energy receiving sphere 14, as shown in FIG. 3. The rays 42 of the sun impinging upon the lenses which do not become focused on the sphere will impinge the reflective inner surface 24 of the sphere, and will be focused by the reflective surface 24 onto the energy receiving means 14.

It is to be understood that the invention is not confined to the particular construction or arrangement of parts herein illustrated and described, but embraces all such modified forms that come within the scope of the following claims.

We claim:

1. An apparatus for collecting solar energy comprising:
    an energy receiving means;
    a circulating means connected to said energy receiving means for circulating a heat absorbing fluid through said receiving means; and
    a hollow, generally spherical means with said energy receiving means positioned substantially at the center thereof, said hollow, generally spherical means including a leanse means forming a portion of said spherical means and located in the upper portion thereof, said lenses means positioned to direct and concentrate sun rays onto said energy receiving means and onto the inner surface of said spherical means, said inner surface of said spherical means upon which sun rays are directed by said lenses means including a reflective material to thereby reflect said sun rays impinging upon said inner surface back to said energy receiving means.

2. An apparatus for collecting solar energy comprising:
    an energy receiving means;
    a circulating means connected to said energy receiving means for circulating a heat absorbing fluid through said receiving means; and
    a hollow, generally spherical means with said energy receiving means positioned substantially at the center thereof, said hollow, generally spherical means including a lenses means forming a portion of said spherical means and located in the upper portion thereof, said lenses means positioned to direct and concentrate a substantial portion of sun rays passing therethrough onto said energy receiving means and the remaining portion passing therethrough onto the inner surface of said spherical means, said inner surface of said spherical means upon which sun rays are directed by said lenses means including a reflective material to thereby reflect said sun rays impinging upon said inner surface back to said energy receiving means.

3. An apparatus according to claims 1 or 2, and wherein said hollow generally spherical means comprises two hemispherical portions connected by a vertical cylindrical portion.

4. An apparatus according to claims 1 or 2, and wherein said lenses means comprises generally the upper half of one of said hemispherical portions.

5. An apparatus according to claims 1 or 2, and wherein said energy receiving means and said circulating means comprise:
    an inner sphere with a bore extending through it center,
    an inner cylindrical pipe extending into said bore and attached to said inner sphere,
    a hollow outer sphere with said inner sphere positioned at its center, and
    an outer cylindrical pipe with said inner cylindrical pipe positioned at its center, said outer cylindrical pipe extending into and attached to said outer sphere.

6. An apparatus according to claims 1 or 2, and wherein said energy receiving means comprises a hollow heat conductive sphere with a radiant energy absorbing paint covering.

7. An apparatus according to claim 6 wherein said hollow heat conductive sphere has an outer surface and wherein said hollow generally spherical means has an inner surface and wherein the ratio of the area of said hollow generally spherical means inner surface and the area of said hollow heat conductive sphere's outer surface is about 19 to 1.

8. An apparatus according to claims 1 or 2, and wherein said lenses means comprises a plurality of lense concentrically-focused on said energy receiving means.

* * * * *

UNITED STATES PATENT AND TRADEMARK OFFICE
CERTIFICATE OF CORRECTION

PATENT NO. : 4,422,434
DATED : December 27, 1983
INVENTOR(S) : Robert G. Statz et al It is certified that error appears in the above—identified patent and that said Letters Patent is hereby corrected as shown below:

Column 3, Line 55, Claim 1, After "a" and before "means", delete "leanse" and substitute therefor ---lenses---

Column 4, Line 36, Claim 5, After "through", delete "it" and substitute therefor ---its---

Line 58, Claim 8, After "of", delete "lense" and substitute therefor ---lenses---

Signed and Sealed this

Twenty-second Day of May 1984

[SEAL]

Attest:

GERALD J. MOSSINGHOFF

Attesting Officer

Commissioner of Patents and Trademarks